(12) United States Patent
Hüffner et al.

(10) Patent No.: US 10,896,473 B2
(45) Date of Patent: Jan. 19, 2021

(54) DETECTION AND PREVENTION OF FRAUDULENT ACTIVITY ON SOCIAL MEDIA ACCOUNTS

(71) Applicant: Proofpoint, Inc., Sunnyvale, CA (US)

(72) Inventors: Sharon Hüffner, Berlin (DE); Harold Nguyen, Burlingame, CA (US); Richard Banks Sutton, San Mateo, CA (US); Daniel Oshiro Nadir, Carlsbad, CA (US)

(73) Assignee: PROOFPOINT, INC., Sunnyvale, CA (US)

( * ) Notice: Subject to any disclaimer, the term of this patent is extended or adjusted under 35 U.S.C. 154(b) by 227 days.

(21) Appl. No.: 15/395,385

(22) Filed: Dec. 30, 2016

(65) Prior Publication Data

US 2017/0358032 A1    Dec. 14, 2017

Related U.S. Application Data

(60) Provisional application No. 62/347,089, filed on Jun. 8, 2016.

(51) Int. Cl.
*G06Q 30/02* (2012.01)
*G06Q 10/06* (2012.01)
*G06Q 10/10* (2012.01)
*G06Q 40/02* (2012.01)
*G06Q 99/00* (2006.01)
*G06Q 50/00* (2012.01)
(Continued)

(52) U.S. Cl.
CPC ......... *G06Q 50/01* (2013.01); *G06Q 30/0185* (2013.01); *H04L 63/1425* (2013.01); *H04L 63/1441* (2013.01)

(58) Field of Classification Search
CPC .............. G06Q 50/01; G06Q 30/0185; H04L 63/1425; H04L 63/1441
USPC ................................ 705/318, 319, 1.1–912
See application file for complete search history.

(56) References Cited

U.S. PATENT DOCUMENTS 8,225,413 B1 *  7/2012  De ..................... G06F 21/6245
                                                             726/22
8,412,770 B2    4/2013  Marcucci et al.
(Continued)

FOREIGN PATENT DOCUMENTS

EP           1081665         3/2001

OTHER PUBLICATIONS

Final Office Action for U.S. Appl. No. 13/844,178 dated Sep. 25, 2015, 10 pages.
(Continued)

*Primary Examiner* — Jonathan P Ouellette
(74) *Attorney, Agent, or Firm* — Sprinkle IP Law Group

(57) ABSTRACT

Technology is disclosed for detecting imposters of a brand account. The technology can store a brand profile of the brand account, detect that a message has been publicly communicated to the brand account from a social media account, monitor messages sent publicly to the social media account from other social media accounts by repeatedly comparing the brand profile to metadata of each of the monitored messages, and identify at least one of the other social media accounts as an imposter account based on the comparing. The technology can cease the comparing at predetermined expiration time occurring after the detection of the message that was sent publicly to the brand account.

22 Claims, 4 Drawing Sheets

(51) Int. Cl.
*G06Q 30/00* (2012.01)
*H04L 29/06* (2006.01)

(56) References Cited

U.S. PATENT DOCUMENTS

| | | | |
|---|---|---|---|
| 8,621,215 | B1 | 12/2013 | Iyer |
| 8,668,590 | B2 | 3/2014 | Barclay et al. |
| 8,955,129 | B2* | 2/2015 | Cao .................. H04L 67/22 726/23 |
| 9,037,653 | B2 | 5/2015 | Wiseman et al. |
| 9,055,097 | B1* | 6/2015 | Foster ............... H04L 63/1433 |
| 9,077,744 | B2* | 7/2015 | Beutel .............. H04L 63/1416 |
| 9,105,039 | B2 | 8/2015 | Kramer et al. |
| 9,117,074 | B2* | 8/2015 | Srivastava ........... G06F 21/552 |
| 9,118,689 | B1 | 8/2015 | Apte et al. |
| 9,262,610 | B2* | 2/2016 | Hudack ............... G06F 21/316 |
| 9,286,378 | B1 | 3/2016 | Zarakhovsky et al. |
| 9,369,433 | B1 | 6/2016 | Paul et al. |
| 9,443,273 | B2* | 9/2016 | Rajaram ............... G06Q 50/01 |
| 9,544,325 | B2* | 1/2017 | Foster ................ H04L 63/102 |
| 10,108,968 | B1* | 10/2018 | Tekle ................ G06Q 30/0248 |
| 10,165,003 | B2* | 12/2018 | Kadashevich ...... H04L 63/1408 |
| 10,304,036 | B2* | 5/2019 | Chandrasekaran .... G06Q 10/10 |
| 2010/0095375 | A1* | 4/2010 | Krishnamurthy ..... G06F 21/554 726/22 |
| 2010/0153175 | A1 | 6/2010 | Pearson et al. |
| 2010/0250347 | A1* | 9/2010 | Rainier ................. G06Q 30/02 705/14.4 |
| 2011/0113096 | A1 | 5/2011 | Long et al. |
| 2011/0213646 | A1 | 9/2011 | Ali |
| 2011/0276513 | A1 | 11/2011 | Erhart et al. |
| 2011/0321132 | A1 | 12/2011 | Slingerland et al. |
| 2012/0124202 | A1 | 5/2012 | Cooper et al. |
| 2012/0150772 | A1 | 6/2012 | Paek et al. |
| 2013/0139224 | A1 | 5/2013 | Wehmeier et al. |
| 2013/0198275 | A1 | 8/2013 | Forsblom et al. |
| 2013/0263206 | A1 | 10/2013 | Nefedov et al. |
| 2014/0012738 | A1 | 1/2014 | Woo et al. |
| 2014/0040170 | A1 | 2/2014 | Zheng et al. |
| 2014/0136492 | A1 | 5/2014 | Lerios et al. |
| 2014/0310346 | A1* | 10/2014 | Deng ..................... H04L 67/22 709/204 |
| 2015/0052138 | A1 | 2/2015 | Sutton et al. |
| 2015/0188941 | A1* | 7/2015 | Boshmaf ............. H04L 63/1441 726/22 |
| 2016/0063218 | A1* | 3/2016 | Nachenberg ........... G06F 21/10 726/26 |
| 2016/0306974 | A1* | 10/2016 | Turgeman .......... G06Q 20/4016 |

OTHER PUBLICATIONS

Non-Final Office Action for U.S. Appl. No. 13/844,178 dated Jan. 14, 2015, 8 pages.
Non-Final Office Action for U.S. Appl. No. 14/306,098 dated Aug. 9, 2016, 16 pages.
Notice of Allowance for U.S. Appl. No. 13/844,178 dated Mar. 28, 2016, 9 pages.
International Search Report and Written Opinion dated Sep. 1, 2017 in International Application No. PCT/US2017/036594, 8 pages.
Non-Final Office Action for U.S. Appl. No. 14/306,098 dated Sep. 27, 2017, 20 pages.
European Search Report issued for European Patent Application No. 17811029.2, dated Sep. 6, 2019, 6 pages.
European Examination Report in Patent Application No. 17811029.2 dated Jun. 2, 2020, 6 pgs.

* cited by examiner

DETECTION AND PREVENTION OF FRAUDULENT ACTIVITY ON SOCIAL MEDIA ACCOUNTS

CROSS-REFERENCE TO RELATED APPLICATION(S)

The present application claims the benefit of U.S. Provisional Patent Application No. 62/347,089, filed Jun. 8, 2016, entitled "DETECTION AND PREVENTION OF FRAUDULENT ACTIVITY ON SOCIAL MEDIA ACCOUNTS," which is incorporated herein in its entirety by reference.

BACKGROUND

Social networking platforms and networks, including, e.g., FACEBOOK, GOOGLE+, LINKEDIN, TWITTER, YOUTUBE, XING, and many others, are commonly employed by millions of users. They have become so pervasive that they are now commonly used even by organizations and other commercial enterprises to advertise as well as communicate with their target audiences on behalf of the organizations. (The social networking platforms named in this application may be registered or common law trademarks of entities unrelated to the applicant. Applicant makes no claim of ownership over any such trademarks.)

A social media account (or simply "account") is an account on one or more social networking platforms ("social network"). An account can be associated with an individual (e.g., a natural person) or it can be associated with an organization (e.g., created by an employee of the organization) for broadcasting information about the organization or its products or services. Creating accounts on these social networks is relatively simple and users can create a "presence" on the social networks for themselves, their products, their brands and/or their initiatives. To present a consistent social identity across social networking platforms, individuals and organizations can create a social media account on each social networking platform using similar or identical names, pictures and descriptions. The individual or organization can then broadcast similar or identical content across multiple or even all of their social media accounts to reach the audiences or constituents on each social networking platform to which they are connected.

Similarly, an individual or organization can create multiple social media accounts on the same social networking platform to represent different products or "personas." Even though these social media accounts may appear to be different, the same person or representative of a company or other entity can control, configure and post content using these accounts.

Individuals or companies attempting to engage in "bad" activity ("fraudulent users") on a social networking platform can attempt to evade detection by creating multiple social media accounts ("fake social media accounts") on this social networking platform that appear to represent non-malicious or real-world identities. Examples of bad activity include, e.g., violating social networking platforms' rules regarding terms of use, abusive online behavior, violating laws, etc. These malicious individuals or companies can then interact with legitimate social media accounts on social networking platforms via one or more of these fake social media accounts with malicious intent, e.g., abusing, bullying, exploiting, harming, infecting (e.g., with malware or viruses), or stealing from the legitimate social media accounts.

To operate at a high scale, these fraudulent users may write software programs, commonly called "bots," that automate the creation of multiple social media accounts and the publishing of social content using those accounts. This technique is most often used to spread spam, malware, or other abusive or malicious content to legitimate social media users, who then may read or potentially act upon the content.

Social networks generally have programmatic application program interfaces (APIs) that enable third party applications ("social applications" or simply "applications") to integrate with the social networks and provide additional services for the social networks' users. These APIs provide access to public data within the social network. Access to private data may also be allowed if it is granted by the social media account that owns that data.

DETAILED DESCRIPTION

Technology is disclosed that identifies and prevents malicious activity, such as fraudulent activity and behavior, perpetrated by fake brand social media accounts (referred to herein as "imposter accounts"). An imposter account maliciously targets other social media accounts that are followers, connections, and commenters on a legitimate company's official or endorsed social media account (referred to herein as a "brand account"). The legitimate owner of the brand can include, for example, a retailer, a financial institution (e.g., a bank), a product manufacturer, an e-commerce website, etc. Typically, a malicious actor uses an imposter account to masquerade as the brand account to illicitly solicit followers, customers, or commenters on the brand account.

In various embodiments, the technology can be implemented by a fraud detection and prevention system that protects the brand account and a social media account targeted by an imposter account. Targeted social media accounts can include the social media accounts associated with followers, connections and commenters on the brand account. The technology can identify imposter accounts in real time as they are conducting fraudulent communication with a target social media account. In various embodiments, the technology derives and stores a brand profile (e.g., a brand persona) of the brand account(s) to be protected. The technology uses the brand profile in conjunction with monitoring a targeted social media account over a predetermined time period. In some embodiments, the owner of the brand account can be notified of the imposter accounts and fraudulent activity. In these and other embodiments, users of a targeted account and/or service providers of social media networks can be notified of such imposter accounts and activity. In some embodiments, service providers and others can take action in response to a notification of an imposter account, such as deleting the imposter account, adding the imposter account to a blacklist, and/or canceling transactions initiated by the imposter account.

Figure 1:
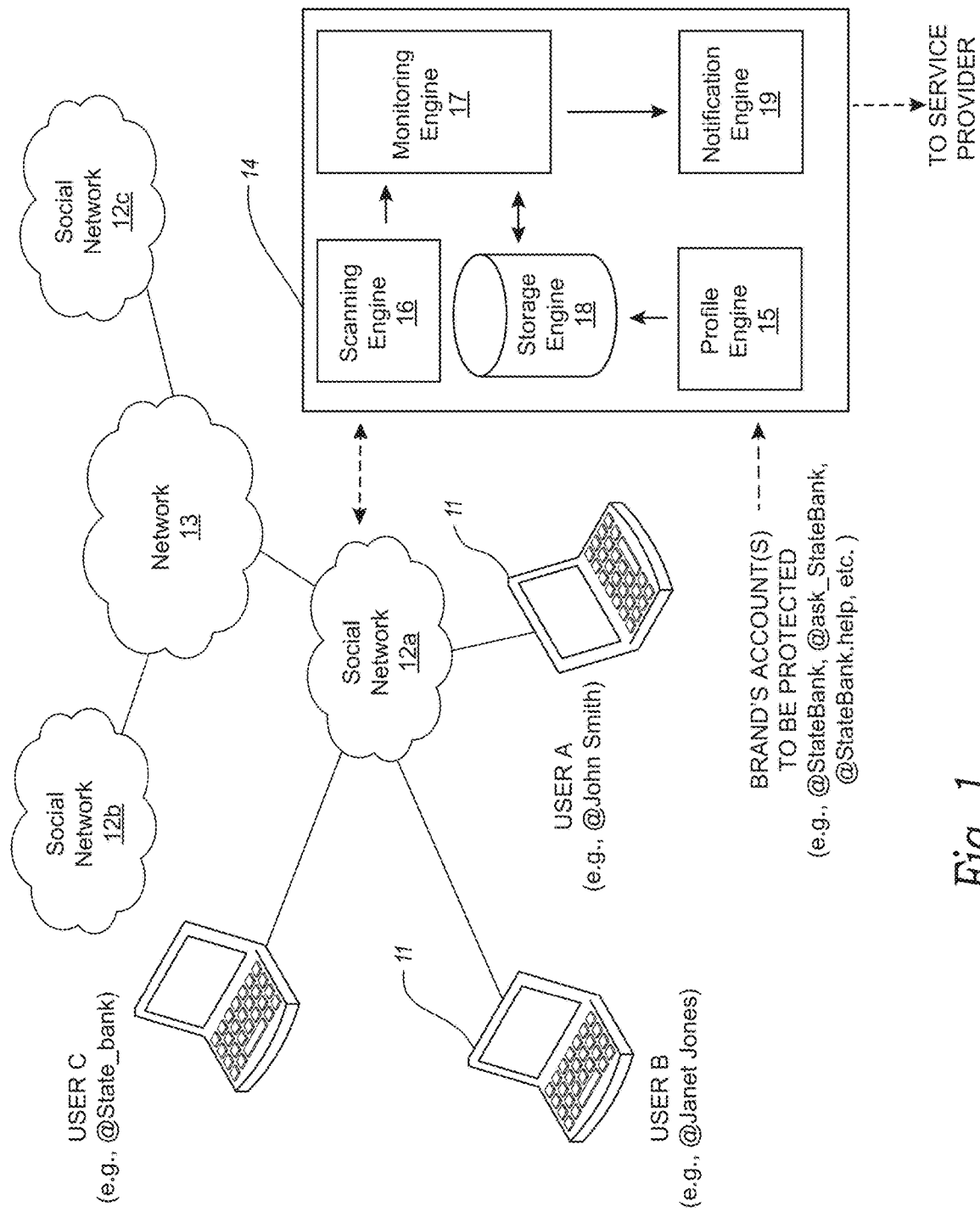
FIG. 1 is a block diagram illustrating various components of the disclosed technology.

FIG. 1 is a schematic block diagram illustrating an environment in which the technology may operate in various embodiments. The environment can include one or more social networks 12a-12c. Examples of social networks can include, but is not limited to, TWITTER, FACEBOOK, PINTEREST, GOOGLE+, YOUTUBE, LINKEDIN, etc. The social networks 12 may be communicatively coupled via a network 13 (e.g., an intranet, the Internet, etc.) with a fraud detection and prevention system 14 ("system 14") associated with the technology and one or more client computing devices 11.

In some embodiments, the system 14 includes a: (1) a brand profile engine 15, which is composed of one or more processes, that produces a brand profile based on metadata of legitimate content used on a social network by an owner of a brand; (2) a scanning engine 16, which is composed of one or more processes, that collects and detects social data and account activity from the APIs of individual social networks; (3) a monitoring engine 17, which is composed of one or more processes, that performs comparisons of the brand profile to social data and identifies imposter accounts based on the comparisons; and (4) a storage engine 18 that stores the brand profile and other social data observed by the scanning engine 16, e.g., outside of the social network it was observed on. In some embodiments, the brand profile engine 15, scanning engine 16, monitoring engine 17, and storing engine 18 may be composed of either a single process or multiple processes that implement a combination of subsets of functionality for each component. The system 14 can further include a notification engine 19 for notifying users, brand owners, and/or social network service providers of an identified imposter account. In operation, the functionality of the engines 15-19 can be exposed via a user interface (not shown) for use on a social media account or across multiple social media accounts.

The profile engine 15 can create and build brand profiles associated with the branding of a brand owner's social media account (i.e., the brand account). In various embodiments, the branding can include graphics and text used to represent the brand account on a social network. The profile engine 15 can store and update brand profiles in the storage engine 18. For example, the profile engine 15 can update a brand profile when accounts are added, modified, or deleted. The individual brand profiles can be based on multiple accounts (e.g., accounts having different handles) used by the brand owner on the social network.

The storage engine 18 can store the brand profiles produced by the profile engine 15. In various embodiments, the storage engine 18 can store brand profiles unique to each brand owner (e.g., a service subscriber) that interacts with the system 14. In various embodiments, brand accounts can be held by any of a variety of companies, advertisers, service providers, etc. having a brand to be protected on one or more social network platforms. The storage engine 18 provides brand profiles to the monitoring engine 17. The scanning engine 16 can detect when a social media account sends a public message to a brand account, and when other social media accounts publicly reply to the account that originated the public message.

The monitoring engine 17 can compare brand profiles and/or characteristics of the brand account to metadata collected from public messages posted on the social network via the scanning engine 16. The monitoring engine 17 can employ various rules and algorithms for analyzing the metadata of the social media accounts that send public messages to the social media account originating the message. The monitoring engine 17 may be configured to monitor the public messages over a predetermined time period that can begin when the scanning engine 16 detects the originating message. The monitoring engine 17 can monitor all messages sent to the originating account, regardless of whether the public messages relate to the topic of the originating message. The rules and algorithms employed by the monitoring engine 17 can further include criteria for comparing the metadata of public messages to the brand profile. In various embodiments, the monitoring engine 17 can determine whether a statistically significant match exists between the compared metadata and the brand profile. A statistically significant match can be indicative of an imposter account that has similar, but not identical metadata or characteristics as the brand account. When such a match occurs, the monitoring engine 17 can relay a notification regarding an imposter account or a potential imposter account via the notification engine 19. The monitoring engine 17 ceases comparing the brand profile of to the metadata of the monitored messages when the predetermined time period has elapsed.

FIG. 1 shows an example brand account, named "StateBank," that can be monitored by the system 14 over the social network 12a. The social network 12a provides a plurality of social media accounts, including the StateBank brand account and a number of social media accounts associated with users A-C of the social network 12a. In various embodiments, the system can 14 can interact with hundreds, thousands, or millions or more users, user accounts, and brand accounts across one or multiple social networking platforms.

Users of the social network 12a can have social media accounts with addresses, such as TWITTER handles, that enable the social media account holders to message one another. In the illustrated embodiment, StateBank has an account with the handle "@StateBank." As described below, StateBank can be associated with other social media accounts owned by StateBank and upon which the brand profile is based. Users A and B can have unique handles "@John_Smith" and "@Janet_Jones." One or both of Users A and B may be customers of StateBank. For example, User A may hold a checking, savings, or other account at StateBank. Alternately, neither of Users A and B is a customer of StateBank. In either case, the system 14 can detect social media accounts that publicly message (e.g., tweet to) a StateBank brand account.

As further shown in FIG. 1, User C has a unique handle "State_bank," which is an imposter account having a handle that is similar to the handle of StateBank, but adding an underscore and using a lower case "b." As described below, the system 14 can detect and alert others to User C's fraudulent use of the imposter account. In some embodiments, the system 14 can enable StateBank, the social network provider, the user targeted by the imposter, or others (e.g., cyber security enforcement) to intervene and prevent further fraudulent use of the imposter account.

Figure 2A:
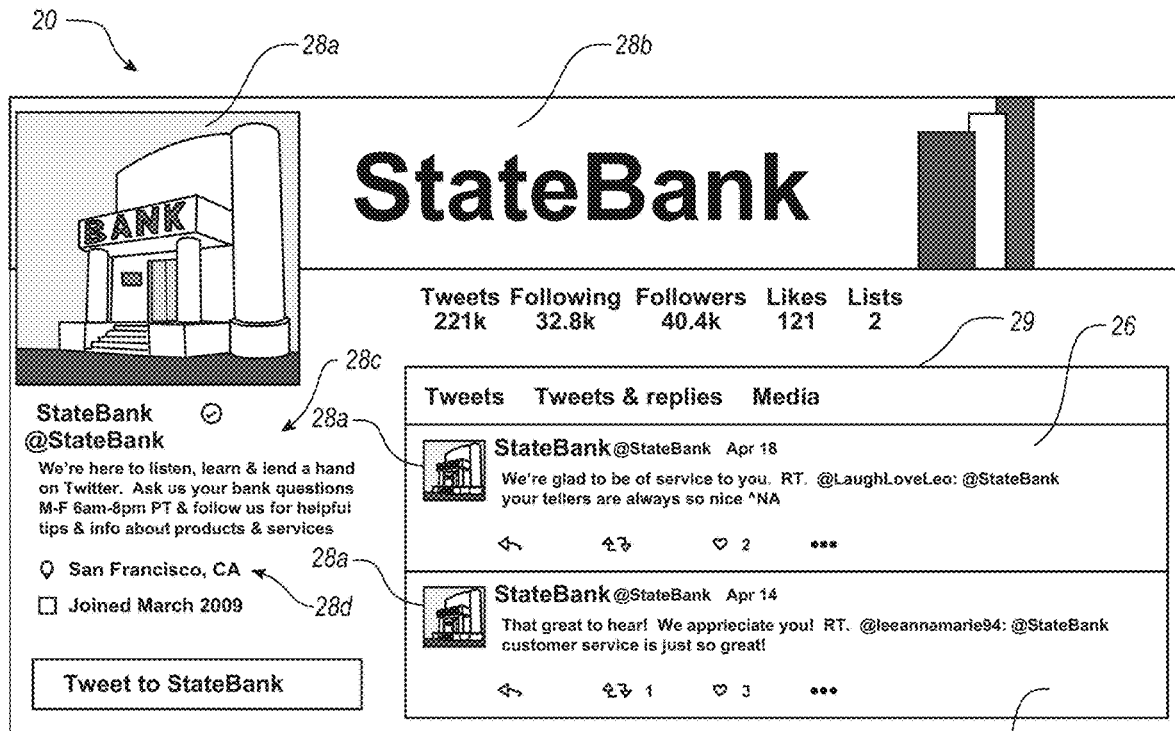
FIG. 2A is a diagram illustrating a landing page of a legitimate brand account.

FIG. 2A is a diagram illustrating a landing page 20 of a legitimate brand account. The landing page of the brand account includes a variety of graphics and text. In the illustrated example, the graphics and text include content 28 corresponding to the brand of StateBank, which can be familiar to customers that use the services of StateBank. The content 28 can include an avatar 28a, a banner image 28b, a description 28c, a geographic location 28d, and other information (e.g., a background color) corresponding to the StateBank brand. StateBank's customers can publicly post messages 26 to the StateBank account that appear in a messaging area 29. In use, public messaging enables State-Bank to provide customers with quick access to business to consumer (B2C) products or technical support. Many social networks, such as TWITTER, FACEBOOK, and LINKE-DIN, provide similar functionality that supports B2C interaction.

Figure 2B:
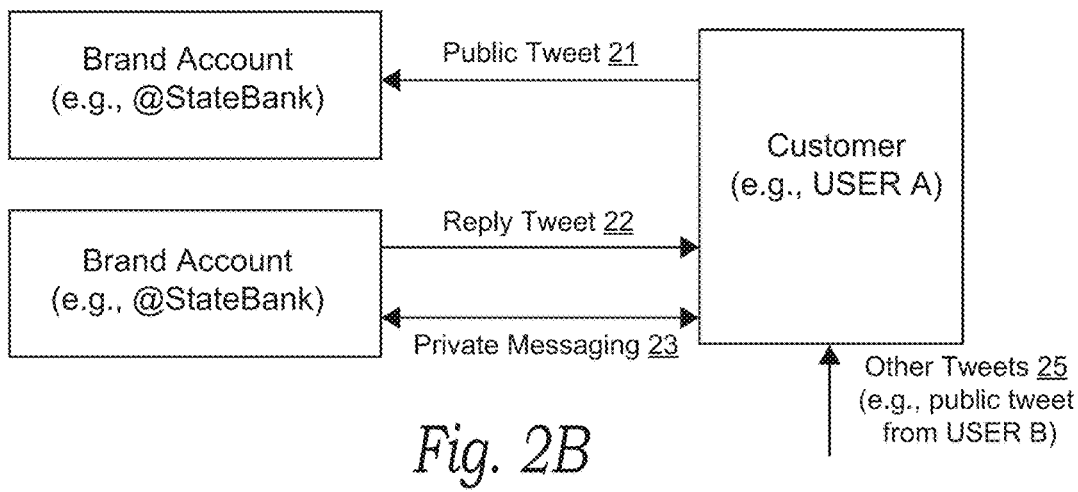
FIG. 2B is a message flow diagram illustrating communications between the brand account and a customer.

FIG. 2B is a message flow diagram illustrating messaging between a customer (e.g., User A) and a legitimate brand account (e.g., StateBank). In the illustrated embodiment, the message flow diagram is described in the context of tweets sent using TWITTER. For example, the customer can send and receive various public/private tweets 25 (e.g., a public tweet sent from User B to User A over the social network 12a (FIG. 1). In other embodiments, the technology can employ other messaging formats specific to the type of social media network platform.

As shown in FIG. 2B, a customer sends a public message 21 to the brand account requesting help of some kind, such as when the customer has an inability to login to a website or has a question about a bill. The brand account can reply publicly to the customer with a message 22, expressing a desire to help and requesting that they reach out using a private messaging feature 23 so that the general public cannot see any further communication. In the case of TWIT-TER, for example, the private messaging feature 23 employs private messages known as Direct Messages. In some instances, the brand account can use an account with a different handle (e.g., "@StateBank.help") for providing customer support, but still bearing the brand name. Most users of social media are savvy enough to understand that they should not provide private data (like account numbers) in public messages. Once the conversation has been moved to private messaging, the brand account can ask a customer for private data including login credentials or account numbers, and the customer is more willing to provide this information, knowing that the messages are private. In general, it is relatively easy (and typically free) to create accounts on social media platforms. Social media sites do this to ensure that new users have the least amount of friction possible to user adoption of their platforms.

Figure 3A:
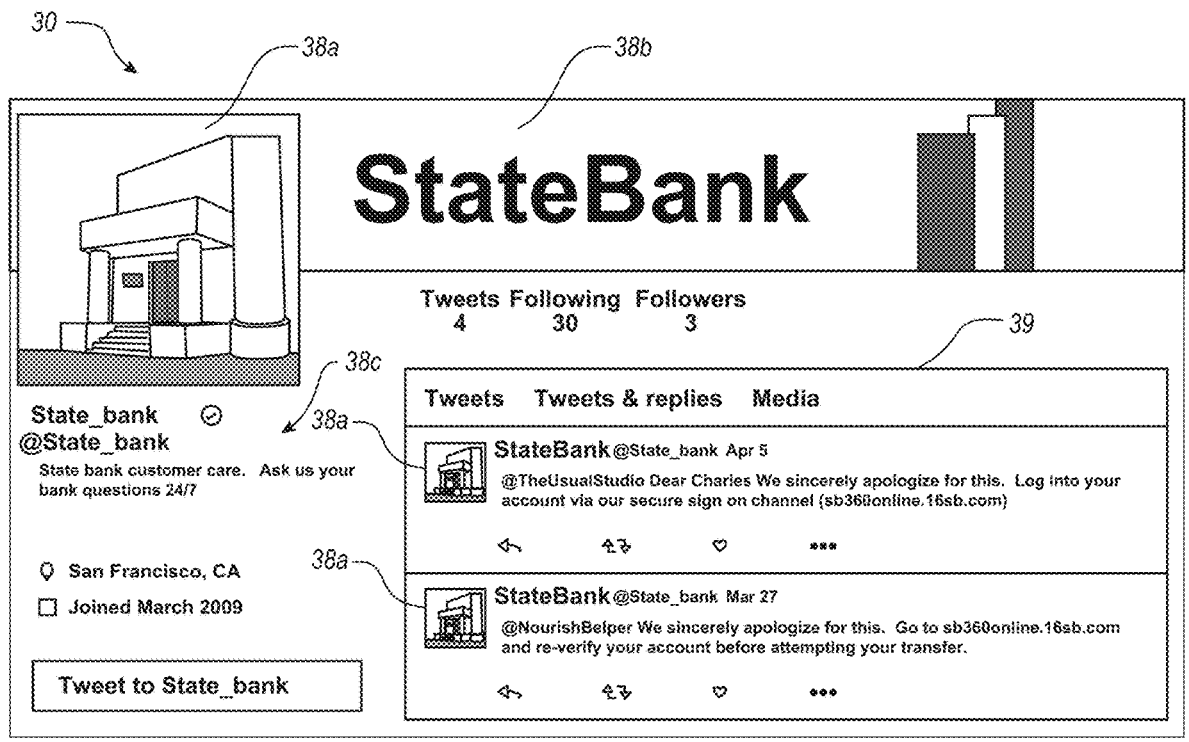
FIG. 3A is a diagram illustrating a landing page of an imposter account of the brand account of FIG. 2A.

Due to the relative ease of account creation on many social media networks, there is typically no process for reviewing new accounts for legitimacy on these networks. One challenge that this presents is malicious actors can exploit the lack or review and restrictions on account creation to create imposter accounts. For example, the imposter accounts can violate trademarks or misuse brands and identities. FIG. 3A, for example, shows a landing page 30 of an imposter account (e.g., User C's account; FIG. 1). In this example, the graphics and text of the imposter account are similar to those used by StateBank. For instance, the imposter account has the handle "@State_bank" and uses an avatar 38a, banner 38b, and messaging area 39 similar to StateBank's. Another challenge with imposter accounts is that the responsibility falls on the brand owner to identify an imposter account and report it to the social media platform.

Figure 3B:
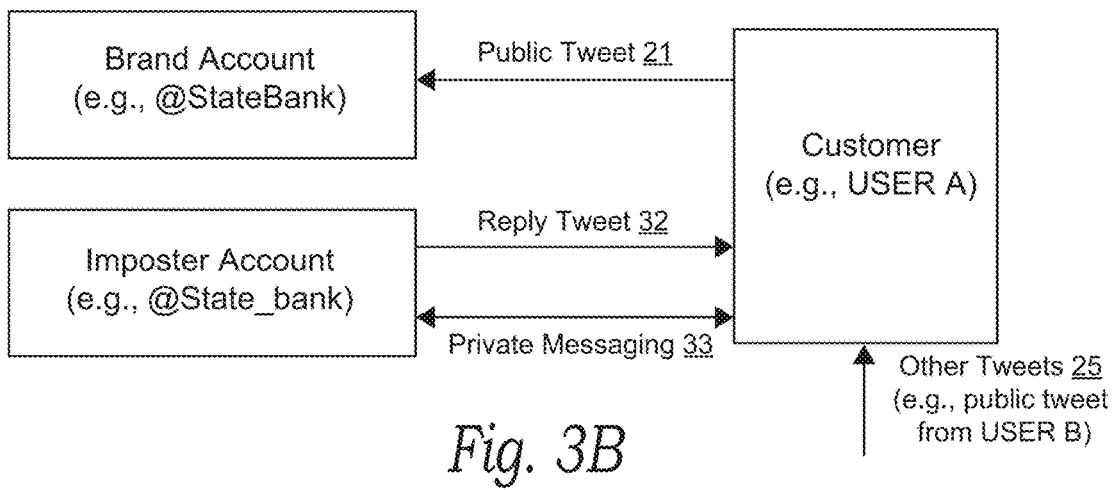
FIG. 3B is a message flow diagram illustrating communications between the imposter account and a customer targeted by the imposter account.

Yet another challenge with imposter accounts is that they are used by malicious actors to hijack private B2C conversations. FIG. 3B is a message flow diagram illustrating the imposter account (e.g., User C; FIG. 1) hijacking the communications with a customer (e.g., User A). The message flow may initial be similar to the message flow shown in FIG. 2B, except that the malicious actor sends a public message 32 to the customer before the brand account has an opportunity to reply to the customer. A malicious actor typically waits for a customer of the target brand to send the public message 21 to the brand account. The malicious actor may respond nearly immediately (e.g., within seconds or minutes) with the public message 32. Since the imposter account bears a similar resemblance to the real brand account (e.g., similar avatar, message format, etc.), the customer can be lured into communicating with the impostor account via private messaging 33 and convinced to click links to phishing sites or sites hosting malware, or convinced to divulge private information through private messages.

Referring back to FIG. 3A, in some cases, the imposter account can post hours of operation in a description 36c of the account's landing page 30 that extend outside of the normal operating hours of the legitimate brand owner. In such cases, the malicious actor can simply wait until the real brand account is "off hours" and begin hijacking conversations with customers without fear of being interrupted by the real brand account. In some cases, malicious actors may create imposter accounts that imitate the user support services of a real brand account. For example, a legitimate brand account may use a handle "@ask_brand" (e.g., "@State_bank.help") for technical or other support. This makes the legitimate conversation flow look much like the malicious conversation flow, which makes it harder for a customer to see the difference. Embodiments of the present invention; however, can thwart these and other types of malicious activity from imposter accounts.

Figure 4A:
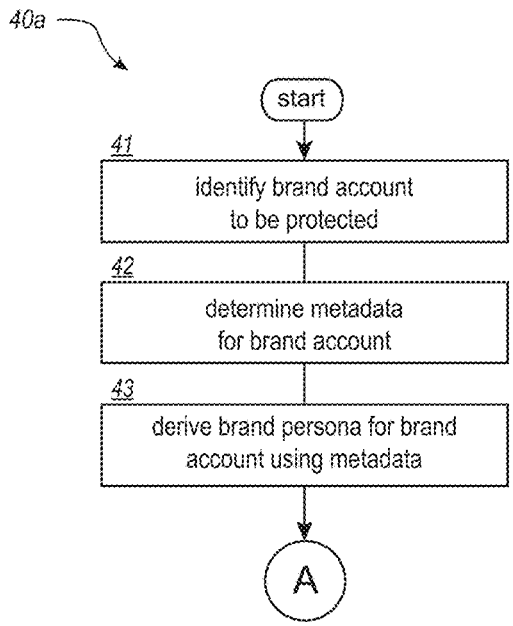
FIGS. 4A-4C are flow diagrams illustrating routines invoked by the technology in various embodiments to detect and thwart imposters of a brand account on a social network platform in accordance with the present technology.
Figure 4B:
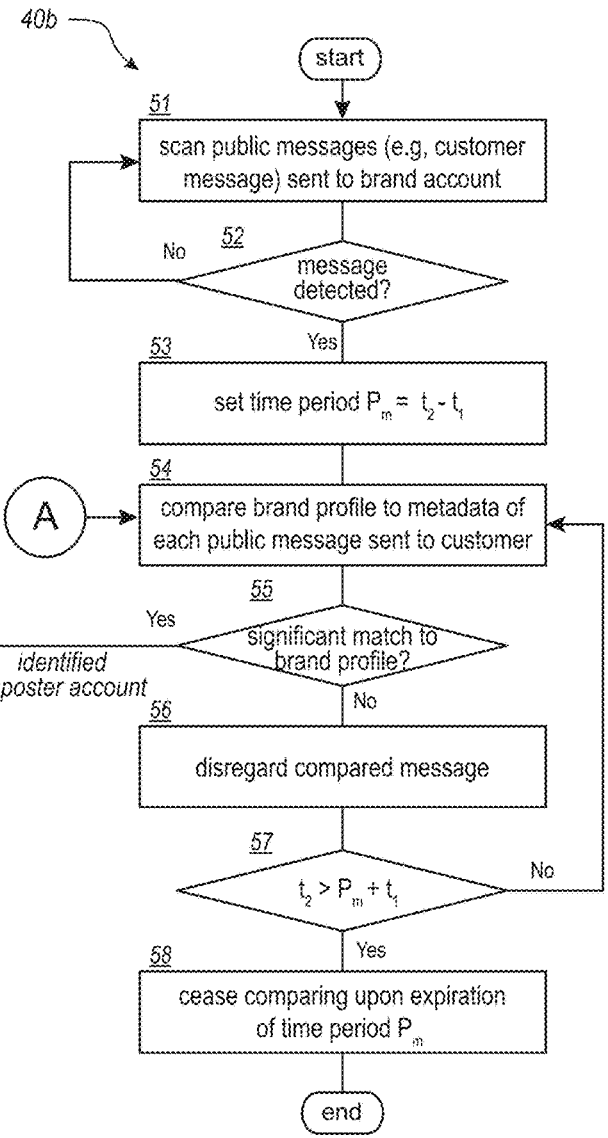
Figure 4C:
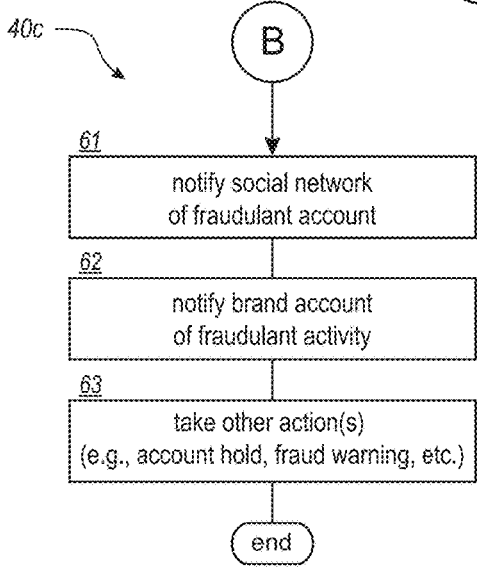

FIGS. 4A-4C are flow diagrams illustrating routines 40a-c, respectively, invoked by the technology in various embodiments to detect and thwart imposters of a brand account on a social network platform. In various embodiments, one or more of the routines 40a-c may be provided by an enterprise service to which companies can subscribe to protect their brand accounts. Referring to FIG. 4A, the routine 40a begins at block 41 by identifying the brand account to be protected. At block 42, the routine 40b determines metadata for a brand profile used to monitor the brand account. At block 43, the routine 40a derives the brand profile based on metadata of legitimate content used on the social network by an owner of the brand. For example, in the illustrated example above, StateBank can provide to the system 14 (FIG. 1) links to the bank's various accounts, and the system 14 can retrieve the metadata via the social network's API. The profile engine 15 (FIG. 1) can generate the brand profile based, e.g., on the graphics (e.g., the avatars, background, color scheme), text, and other information corresponding to the various content of the landing page, the messaging area, message formats, etc., used by the brand account on the social network platform. For example, the brand profile can include metadata corresponding to a placement (e.g., a relative location) and/or or a color of certain graphical content (e.g., the avatar 28a or logo) in the brand owner's messages 26 (FIG. 2A). The brand profile can also be based on text, such as keywords typically found in the description 28c, the size and/or font type of text, the geographical location 28d, language, the presence and/or absence of certain content fields, etc.

In various embodiments, a brand profile can apply to a client as a whole and may be based on tens, hundreds, thousands, or more brand accounts owned by the brand and having different variants. For example, a brand profile applied to TWITTER accounts can be based on the metadata (e.g., graphics and text) from any of the brand's accounts that uses the brand name in the handle (e.g., "@brand,"

"@ask_brand," "@brandsupport," "@brandUSA," "@brandcalifornia," "@brand_advisors," "@brand.help," etc.). In some embodiments, the routine 40a can use machine learning and create clusters based on similarities and differences between the variants of the accounts of the brand. In various embodiments, the brand profile may be periodically updated, for example, when the brand owner creates new accounts, removes old accounts, and/or makes changes to existing accounts.

Referring to FIG. 4B, the routine 40b detects when a message has been publicly communicated to the brand account from a social media account (blocks 51 and 52), such as a customer account. For instance, in the illustrated example described above, the routine 40b can detect the message 21 (FIG. 2B) publicly tweeted by the customer to the brand account. Once the routine 40b detects the public message (block 52), the routine 40b begins monitoring all public messages sent to the customer account (blocks 53-56). For example, the routine 40b can monitor tweets, public chats, etc., sent from any other social media account of the social network 12a (FIG. 1) to the customer account. In various embodiments, the routine 40b may monitor public messages sent to the customer account using an API provided by a social network platform.

At block 53, the routine 40b sets a duration for a predetermined time period $P_m$ over which the public messages sent to the customer are monitored. The predetermined time period $P_m$ can begin at an initial time $t_1$ that the customer sent the original message and an expiration time $t_2$. At blocks 54-57, the routine 40b repeatedly compares the brand profile to metadata of each of the public messages sent to the monitored account until the predetermined time period $P_m$ expires. In various embodiments, each comparison can reveal whether a public message sent to the customer's social media account bears statistically significant similarities to the brand account based on the brand profile and the metadata of the public message that is being compared. If the routine 40b determines that a message does not bear statistically significant similarities, the routine 40b can disregard the message (block 56). For example, the public message 25 (FIG. 2B) sent to User A from User B would not bear a statistically significant similarity due to, e.g., the different handle names of these accounts. As such, the routine 40b can disregard the public message 25 sent from user B to User A during time period $P_m$. The routine 40b does not monitor public messages sent to the customer after the predetermined duration of time $P_m$ has elapsed.

In various embodiments, the routine 40b can employ expert systems and machine learning via the monitoring engine 17 to determine if a public message includes metadata that bears a statistically significant similarity with the brand profile. For example, in the case of the imposter account described above, the routine 40b can determine that the shape, color, and/or relative location of the various features in the avatar 38a (FIG. 3A) sent in the public message 31 (FIG. 3B) are statistically significant despite the omission of the word "BANK" from the avatar 38a and the slightly different coloring. Further, the similarity between the handle of the imposter and brand accounts could trigger a statistically significant match in conjunction with the determination that there are slight variations in the features of the avatar 38a. In some embodiments, statistically significant similarities can be based on lexicographical similarities as in a small Levenshtein distance, use of the same third party publishing application, use of a similar URL characteristic (e.g., same URL, URLs that redirect to the same final location, URLs that link to the same URL domain or URLs that link to the same content hosted on different URL domains), use of the same or similar images; and/or multiple of these factors or other used in combination.

At block 55, if the comparison of a monitored message and the brand profile yields a statistically significant match, the social media account that sent the message is identified as an imposter account. In some embodiments, corrective action can be taken in response to such an identification. For example, the routine 40c (FIG. 4C) can notify a social network, the brand owner, or others (e.g., the customer), any of which may take corrective actions (e.g., by placing an account hold, freezing a transaction, etc.), as shown in blocks 61-63.

Referring back to FIG. 4B, at block 46, the routine 40b ceases the comparison upon expiration of the time period $P_m$. In various embodiments, the time period $P_m$ has a limited duration, such as a duration of no longer than about, e.g., 15 minutes, 30 minutes, or an hour. Fraudulent phishing and other attacks may often occur, for example, within a few minutes of when a potential victim publicly communicates (e.g., posts) to another account. The expiration time can be selected based on the amount of information to be monitored over the social network's API. For example, routines employing computationally intensive algorithms for determining statistical significance of the comparison at blocks 54 and 55, may monitor for time periods of relatively shorter duration (e.g., 30 minutes, 20 minutes, 15 minutes or less). In some embodiments, the duration of the monitoring period $P_m$ can be selected based on the size of the social network, which may have tens or hundreds of millions of accounts and billions of messages to be monitored. In various embodiments, the monitoring period $P_m$ can be selected to provide a suitable window of time for identifying a large majority of imposter accounts without overburdening the system 14. For example, customers that receive a reply from an imposter outside of a 30-minute window of time may have had their issue already resolved and/or the delayed reply may cause the customer to be more suspicious of an imposter account.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Further, those skilled in the art will appreciate that the logic illustrated in the Figures and described above may be altered in a variety of ways. For example, the order of the logic may be rearranged, substeps may be performed in parallel, illustrated logic may be omitted, other logic may be included, etc.

From the foregoing, it will be appreciated that specific embodiments of the disclosure have been described herein for purposes of illustration, but that various modifications may be made without deviating from the spirit and scope of the various embodiments of the disclosure. Further, while various advantages associated with some embodiments of the disclosure have been described above in the context of those embodiments, other embodiments may also exhibit such advantages, and not all embodiments need necessarily exhibit such advantages to fall within the scope of the invention. Accordingly, the disclosure is not limited, except as by the appended claims.

We claim:

1. A method, comprising:
    determining, by a fraud detection and prevention system, a brand account for which a brand owner of the brand account has subscribed for brand protection by the fraud detection and prevention system, the fraud detection and prevention system having a processor and a non-transitory computer-readable medium, the brand account being an account on a social network platform, the fraud detection and prevention system operating in a computing environment outside the social network platform;
    determining, by the fraud detection and prevention system using a link to the brand account on the social network platform, metadata of legitimate content used on the social network platform by the brand owner, the link provided to the fraud detection and prevention system by the brand owner and comprises an application programming interface (API) of the social network platform, the determining comprising retrieving the metadata from the social network platform via the API;
    deriving, by the fraud detection and prevention system, a brand profile based at least on the metadata of legitimate content used on the social network platform by the brand owner, the brand profile applicable across multiple brand accounts on the social network platform that are owned by the brand owner;
    detecting, by the fraud detection and prevention system via at least one application programming interface, a public message to the brand account on the social network platform and public replies to the public message by non-brand accounts on the social network platform, the public message originating from a social media account on the social network platform;
    responsive to the detecting, monitoring, by the fraud detection and prevention system over a predetermined time period, public messages sent to the social media account on the social network platform, the monitoring comprising:
        analyzing metadata of a non-brand account that is in communication with the social media account that originated the public message; and
        determining whether a statistically significant match exists between the metadata of the non-brand account and the brand profile; and
    responsive to a determination by the fraud detection and prevention system that the statistically significant match exists between the metadata of the non-brand account and the brand profile, identifying, by the fraud detection and prevention system to the brand owner, the non-brand account as an imposter account or a potential imposter account.

2. The method according to claim 1, wherein the monitoring begins when the public message to the brand account is detected by the fraud detection and prevention system and ends when a predetermined time period has elapsed.

3. The method according to claim 2, wherein the predetermined time period is about 30 minutes or less.

4. The method according to claim 2, wherein the predetermined time period is about 15 minutes or less.

5. The method according to claim 1, wherein the identifying takes place in real time as the non-brand account conducts fraudulent communication with the social media account that originated the public message.

6. The method according to claim 1, further comprising:
    collecting, by the fraud detection and prevention system, social data and account activity associated with the brand account from the social network platform; and
    storing, by the fraud detection and prevention system, the social data and the account activity from the social network platform in a storage component of the fraud detection and prevention system outside of the social network platform.

7. The method according to claim 1, wherein the deriving the brand profile based at least on the metadata of the legitimate content used on the social network platform by the brand owner further comprises using machine learning and creating clusters based on similarities and differences between variants of accounts owned by the brand owner.

8. The method according to claim 1, wherein the metadata of the legitimate content used on the social network platform by the brand owner comprises at least one of content placement, content location, color, keyword, text size, font type, geographical location, presence or absence of a content field, or language of the legitimate content.

9. A fraud detection and prevention system, comprising:
    a processor;
    a non-transitory computer-readable medium; and
    stored instructions translatable by the processor for:
        determining a brand account for which a brand owner of the brand account has subscribed for brand protection by the fraud detection and prevention system, the brand account being an account on a social network platform, the fraud detection and prevention system operating in a computing environment outside the social network platform;
        determining, using a link to the brand account on the social network platform, metadata of legitimate content used on the social network platform by the brand owner, the link provided by the brand owner and comprises an application programming interface (API) of the social network platform, the determining comprising retrieving the metadata from the social network platform via the API;
        deriving a brand profile based at least on the metadata of legitimate content used on the social network platform by the brand owner, the brand profile applicable across multiple brand accounts on the social network platform that are owned by the brand owner;
        detecting, via at least one application programming interface, a public message to the brand account on the social network platform and public replies to the public message by non-brand accounts on the social network platform, the public message originating from a social media account on the social network platform;
        responsive to the detecting, monitoring public messages sent to the social media account on the social network platform over a predetermined time period, the monitoring comprising:
            analyzing metadata of a non-brand account that is in communication with the social media account that originated the public message; and determining whether a statistically significant match exists between the metadata of the non-brand account and the brand profile; and responsive to a determination by the fraud detection and prevention system that the statistically significant match exists between the metadata of the non-brand account and the brand profile, identifying, by the fraud detection and prevention system to the brand owner, the non-brand account as an imposter account or a potential imposter account.

10. The fraud detection and prevention system of claim 9, wherein the monitoring begins when the public message to the brand account is detected by the fraud detection and prevention system and ends when a predetermined time period has elapsed.

11. The fraud detection and prevention system of claim 10, wherein the predetermined time period is about 30 minutes or less.

12. The fraud detection and prevention system of claim 10, wherein the predetermined time period is about 15 minutes or less.

13. The fraud detection and prevention system of claim 9, wherein the identifying takes place in real time as the non-brand account conducts fraudulent communication with the social media account that originated the public message.

14. The fraud detection and prevention system of claim 9, wherein the stored instructions are further translatable by the processor for:
    collecting social data and account activity associated with the brand account from the social network platform; and
    storing the social data and the account activity from the social network platform in a storage component of the fraud detection and prevention system outside of the social network platform.

15. The fraud detection and prevention system of claim 9, wherein the deriving the brand profile based at least on the metadata of the legitimate content used on the social network platform by the brand owner further comprises using machine learning and creating clusters based on similarities and differences between variants of accounts owned by the brand owner.

16. A computer program product comprising a non-transitory computer-readable medium storing instructions translatable by a processor of a fraud detection and prevention system outside a social network platform for:
    determining a brand account for which a brand owner of the brand account has subscribed for brand protection by the fraud detection and prevention system, the brand account being an account on a social network platform, the fraud detection and prevention system operating in a computing environment outside the social network platform;
    determining, using a link to the brand account on the social network platform, metadata of legitimate content used on the social network platform by the brand owner, the link provided by the brand owner and comprises an application programming interface (API) of the social network platform, the determining comprising retrieving the metadata from the social network platform via the API;
    deriving a brand profile based at least on the metadata of legitimate content used on the social network platform by the brand owner, the brand profile applicable across multiple brand accounts on the social network platform that are owned by the brand owner;
    detecting, via at least one application programming interface, a public message to the brand account on the social network platform and public replies to the public message by non-brand accounts on the social network platform, the public message originating from a social media account on the social network platform;
    responsive to the detecting, monitoring public messages sent to the social media account on the social network platform over a predetermined time period, the monitoring comprising:
        analyzing metadata of a non-brand account that is in communication with the social media account that originated the public message; and
        determining whether a statistically significant match exists between the metadata of the non-brand account and the brand profile; and
    responsive to a determination by the fraud detection and prevention system that the statistically significant match exists between the metadata of the non-brand account and the brand profile, identifying, by the fraud detection and prevention system to the brand owner, the non-brand account as an imposter account or a potential imposter account.

17. The computer program product of claim 16, wherein the monitoring begins when the public message to the brand account is detected by the fraud detection and prevention system and ends when a predetermined time period has elapsed.

18. The computer program product of claim 17, wherein the predetermined time period is about 30 minutes or less.

19. The computer program product of claim 17, wherein the predetermined time period is about 15 minutes or less.

20. The computer program product of claim 16, wherein the identifying takes place in real time as the non-brand account conducts fraudulent communication with the social media account that originated the public message.

21. The computer program product of claim 16, wherein the instructions are further translatable by the processor for:
    collecting social data and account activity associated with the brand account from the social network platform; and
    storing the social data and the account activity from the social network platform in a storage component of the fraud detection and prevention system outside of the social network platform.

22. The computer program product of claim 16, wherein the deriving the brand profile based at least on the metadata of the legitimate content used on the social network platform by the brand owner further comprises using machine learning and creating clusters based on similarities and differences between variants of accounts owned by the brand owner.

* * * * *